US011770362B2

(12) United States Patent
Jonytis et al.

(10) Patent No.: US 11,770,362 B2
(45) Date of Patent: *Sep. 26, 2023

(54) ACCESS CONTROL IN A MESH NETWORK

(71) Applicant: UAB 360 IT, Vilnius (LT)

(72) Inventors: Mantas Jonytis, Grigiskes (LT); Rytis Karpuška, Vilniaus r. (LT)

(73) Assignee: UAB 360 IT, Vilnius (LT)

( * ) Notice: Subject to any disclaimer, the term of this patent is extended or adjusted under 35 U.S.C. 154(b) by 84 days.

This patent is subject to a terminal disclaimer.

(21) Appl. No.: 17/565,410

(22) Filed: Dec. 29, 2021

(65) Prior Publication Data

US 2023/0208910 A1 Jun. 29, 2023

Related U.S. Application Data

(63) Continuation of application No. 17/565,265, filed on Dec. 29, 2021.

(51) Int. Cl.
*H04L 67/104* (2022.01)
*H04L 9/40* (2022.01)
*H04L 41/0893* (2022.01)

(52) U.S. Cl.
CPC ...... *H04L 67/1046* (2013.01); *H04L 41/0893* (2013.01); *H04L 63/062* (2013.01); *H04L 63/10* (2013.01)

(58) Field of Classification Search
CPC ......... H04L 47/11; H04L 69/22; H04L 47/24; H04L 45/122; H04L 47/20; H04L 45/20; H04L 45/38
See application file for complete search history.

(56) References Cited

U.S. PATENT DOCUMENTS

| 7,058,024 | B1* | 6/2006 | Koay | H04L 45/26 370/255 |
| 7,512,131 | B2 | 3/2009 | Svensson et al. | |
| 7,515,573 | B2* | 4/2009 | Bajic | H04W 8/08 370/389 |
| 7,606,147 | B2 | 10/2009 | Luft et al. | |

(Continued)

FOREIGN PATENT DOCUMENTS

| CN | 105871908 A | 8/2016 |
| EP | 1869828 A1 | 12/2007 |

(Continued)

*Primary Examiner* — Mahran Y Abu Roumi
(74) *Attorney, Agent, or Firm* — The Pattani Law Group

(57) ABSTRACT

A method including determining, by a first device in communication with a second device in a mesh network, an access policy associated with processing communications received from the second device; processing, by the first device based at least in part on the access policy, a first communication received from the second device over an exclusive meshnet connection between the first device and the second device; determining, by the first device, a change in the access policy associated with processing communications received from the second device; processing, by the first device based at least in part on the change in the access policy, a second communication received from the second device in real-time; and transmitting, by the first device to the second device, access policy information indicating the change in the access policy to the second device over the exclusive meshnet connection or via a relay server.

20 Claims, 7 Drawing Sheets

(56) References Cited

U.S. PATENT DOCUMENTS

| | | | |
|---|---|---|---|
| 7,606,175 | B1 | 10/2009 | Maufer |
| 7,835,301 | B1* | 11/2010 | Maufer ............... H04W 24/02 370/254 |
| 8,094,637 | B1* | 1/2012 | Goel ................. H04W 40/246 370/254 |
| 8,151,088 | B1 | 4/2012 | Bao et al. |
| 8,339,959 | B1 | 12/2012 | Moisand et al. |
| 8,468,590 | B2 | 6/2013 | Callon et al. |
| 8,645,508 | B1* | 2/2014 | Dickinson ........... H04L 45/7453 709/244 |
| 8,687,521 | B1 | 4/2014 | Goel et al. |
| 8,751,691 | B1 | 6/2014 | Brandwine et al. |
| 8,797,867 | B1 | 8/2014 | Chen et al. |
| 9,225,646 | B2 | 12/2015 | Heinz et al. |
| 9,344,365 | B1* | 5/2016 | Hui .................... H04L 61/5092 |
| 9,369,302 | B1 | 6/2016 | Dickinson |
| 9,647,937 | B1 | 5/2017 | Dukes et al. |
| 10,057,162 | B1 | 8/2018 | Singh et al. |
| 10,362,612 | B2* | 7/2019 | Valicherla .......... H04L 12/4641 |
| 10,447,710 | B1 | 10/2019 | Li et al. |
| RE47,894 | E | 3/2020 | Wang |
| 10,630,543 | B1* | 4/2020 | Wei ..................... H04W 4/70 |
| 10,728,149 | B1 | 7/2020 | Ramanujan et al. |
| 10,778,589 | B2 | 9/2020 | Arora et al. |
| 10,911,405 | B1 | 2/2021 | Harland et al. |
| 11,140,200 | B1* | 10/2021 | A ........................ H04L 41/0627 |
| 11,381,480 | B2 | 7/2022 | Zhuang et al. |
| 2004/0165587 | A1 | 8/2004 | Kiyoto et al. |
| 2004/0223498 | A1 | 11/2004 | Sanderson et al. |
| 2005/0198267 | A1* | 9/2005 | Parks ................... H04L 67/51 709/224 |
| 2005/0226250 | A1* | 10/2005 | Makayama ........... H04L 67/56 370/395.21 |
| 2005/0243758 | A1 | 11/2005 | Torarp et al. |
| 2007/0053309 | A1* | 3/2007 | Poojary ................ H04L 45/28 370/256 |
| 2007/0081530 | A1 | 4/2007 | Nomura et al. |
| 2007/0140239 | A1* | 6/2007 | Bauer ................ H04L 61/4511 370/406 |
| 2007/0206537 | A1* | 9/2007 | Cam-Winget ........ H04W 12/06 370/331 |
| 2007/0274224 | A1* | 11/2007 | Suzuki .................. H04L 41/08 370/248 |
| 2008/0137556 | A1* | 6/2008 | Park ................... H04L 61/5046 370/255 |
| 2010/0107225 | A1* | 4/2010 | Spencer .............. H04W 12/069 726/4 |
| 2010/0115272 | A1 | 5/2010 | Batta |
| 2010/0157888 | A1* | 6/2010 | Aggarwal ............. H04L 45/48 370/328 |
| 2010/0232396 | A1* | 9/2010 | Jing ........................ H04W 8/04 370/336 |
| 2010/0241710 | A1* | 9/2010 | Renfroe .............. H04L 61/2575 709/204 |
| 2011/0007669 | A1* | 1/2011 | Yoon .................... H04W 40/24 370/255 |
| 2013/0110920 | A1* | 5/2013 | Broustis .................. H04L 63/04 709/204 |
| 2014/0016501 | A1* | 1/2014 | Kamath ................ H04L 45/64 370/253 |
| 2014/0341307 | A1* | 11/2014 | Barak .................. H04N 19/176 375/240.27 |
| 2015/0055506 | A1* | 2/2015 | Birlik .................... H04W 72/27 370/254 |
| 2016/0080244 | A1* | 3/2016 | Retana ................. H04L 45/021 709/223 |
| 2016/0080502 | A1* | 3/2016 | Yadav ................. H04L 12/4633 709/227 |
| 2017/0048783 | A1* | 2/2017 | Savolainen ........... H04W 76/10 |
| 2017/0161609 | A1* | 6/2017 | Wood .................. H04L 45/121 |
| 2017/0272317 | A1* | 9/2017 | Singla ..................... H04L 41/12 |
| 2017/0329791 | A1* | 11/2017 | Manchester ........... H04N 21/27 |
| 2018/0213460 | A1* | 7/2018 | Adella .................. H04W 40/28 |
| 2019/0124010 | A1* | 4/2019 | Murgia ................. H04L 67/61 |
| 2019/0289038 | A1 | 9/2019 | Li et al. |
| 2019/0306059 | A1* | 10/2019 | Raut .................... H04L 45/745 |
| 2020/0100159 | A1* | 3/2020 | Kang ................... H04W 64/003 |
| 2020/0106703 | A1* | 4/2020 | Wood .................... H04L 45/04 |
| 2020/0145816 | A1* | 5/2020 | Morin ................. H04W 56/001 |
| 2020/0218556 | A1* | 7/2020 | Lissack ............... H04L 41/0894 |
| 2020/0252234 | A1* | 8/2020 | Ramamoorthi ..... H04L 12/2859 |
| 2020/0344299 | A1* | 10/2020 | Sohail ..................... G06F 16/27 |
| 2020/0404742 | A1* | 12/2020 | Hashmani ........... H04L 61/5014 |
| 2021/0029167 | A1* | 1/2021 | Jeong .................... H04L 63/20 |
| 2021/0036986 | A1* | 2/2021 | Qi ....................... H04L 61/2546 |
| 2021/0112443 | A1 | 4/2021 | Krishan et al. |
| 2021/0160167 | A1* | 5/2021 | Zhou ....................... H04L 47/11 |
| 2021/0185039 | A1 | 6/2021 | Huang |
| 2021/0321485 | A1* | 10/2021 | Wu ........................ H04L 45/48 |
| 2021/0328922 | A1* | 10/2021 | Yang ..................... H04L 45/54 |
| 2021/0336852 | A1* | 10/2021 | Omi ..................... H04L 41/22 |
| 2022/0014512 | A1 | 1/2022 | Raleigh et al. |
| 2022/0021729 | A1* | 1/2022 | Bobbitt ................. H04L 67/12 |
| 2022/0046521 | A1* | 2/2022 | Ghessassi ............. H04W 4/027 |
| 2022/0070672 | A1* | 3/2022 | Zhang .................. H04W 64/00 |
| 2022/0103477 | A1 | 3/2022 | Peng et al. |
| 2022/0150154 | A1* | 5/2022 | Pethe ..................... H04L 45/02 |
| 2022/0385623 | A1* | 12/2022 | Henry ................ H04L 61/5038 |

FOREIGN PATENT DOCUMENTS

| | | |
|---|---|---|
| EP | 2052487 B1 | 4/2010 |
| EP | 3253025 A1 | 12/2017 |
| JP | 2004236030 A | 8/2004 |

\* cited by examiner

ACCESS CONTROL IN A MESH NETWORK

CROSS REFERENCE

This application is a continuation of U.S. Non-Provisional patent application Ser. No. 17/565,265, filed on Dec. 29, 2021, and titled "Access Control In A Mesh Network," the entire contents of which are incorporated herein by reference.

FIELD OF DISCLOSURE

Aspects of the present disclosure generally relate to communications in networks, and more particularly to access control in a mesh network.

BACKGROUND

Users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail. Further, installation overhead may be reduced.

SUMMARY

In one aspect, the present disclosure contemplates a method including determining, by a first device in communication with a second device in a mesh network, an access policy associated with processing internet protocol (IP) packets received from the second device in the mesh network; determining, by the first device in the mesh network, that an IP packet is received from the second device over a meshnet connection between the first device and the second device; and processing, by the first device in the mesh network, the IP packet received from the second device in accordance with the access policy based at least in part on determining that the IP packet is received from the second device.

In another aspect, the present disclosure contemplates a first device including a memory and a processor configured to: determine, during communication with a second device in a mesh network, an access policy associated with processing internet protocol (IP) packets received from the second device in the mesh network; determine, in the mesh network, that an IP packet is received from the second device; and process, in the mesh network, the IP packet received from the second device in accordance with the access policy based at least in part on determining that the IP packet is received from the second device.

In another aspect, the present disclosure contemplates a non-transitory computer readable medium storing instructions, which when executed by a processor associated with a first device, cause the processor to: determine, during communication with a second device in a mesh network, an access policy associated with processing internet protocol (IP) packets received from the second device in the mesh network; determine, in the mesh network, that an IP packet is received from the second device; and process, in the mesh network, the IP packet received from the second device in accordance with the access policy based at least in part on determining that the IP packet is received from the second device.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
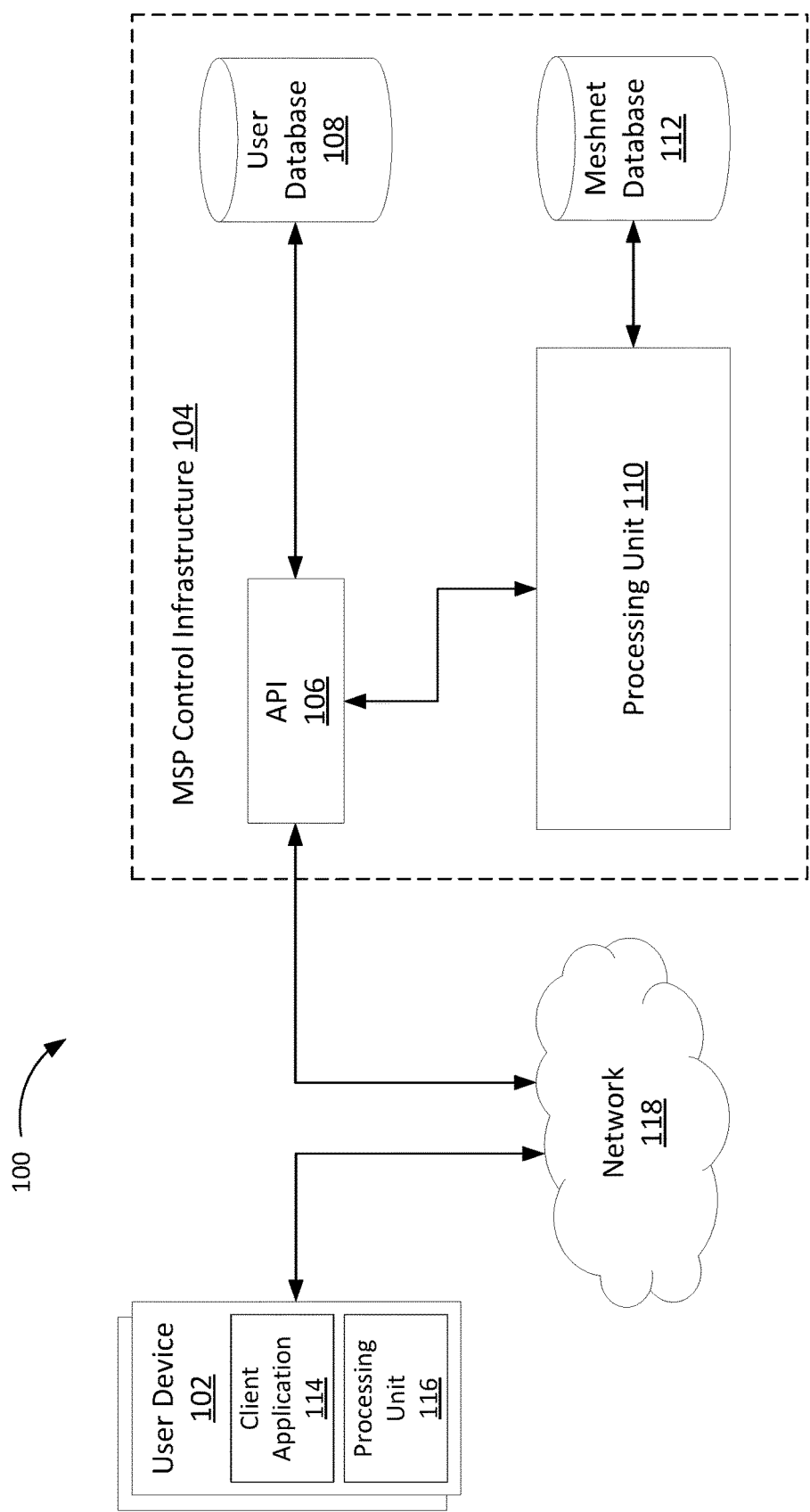

FIG. 1 is an illustration of an example system associated with access control in a mesh network, according to various aspects of the present disclosure.

Figure 2:
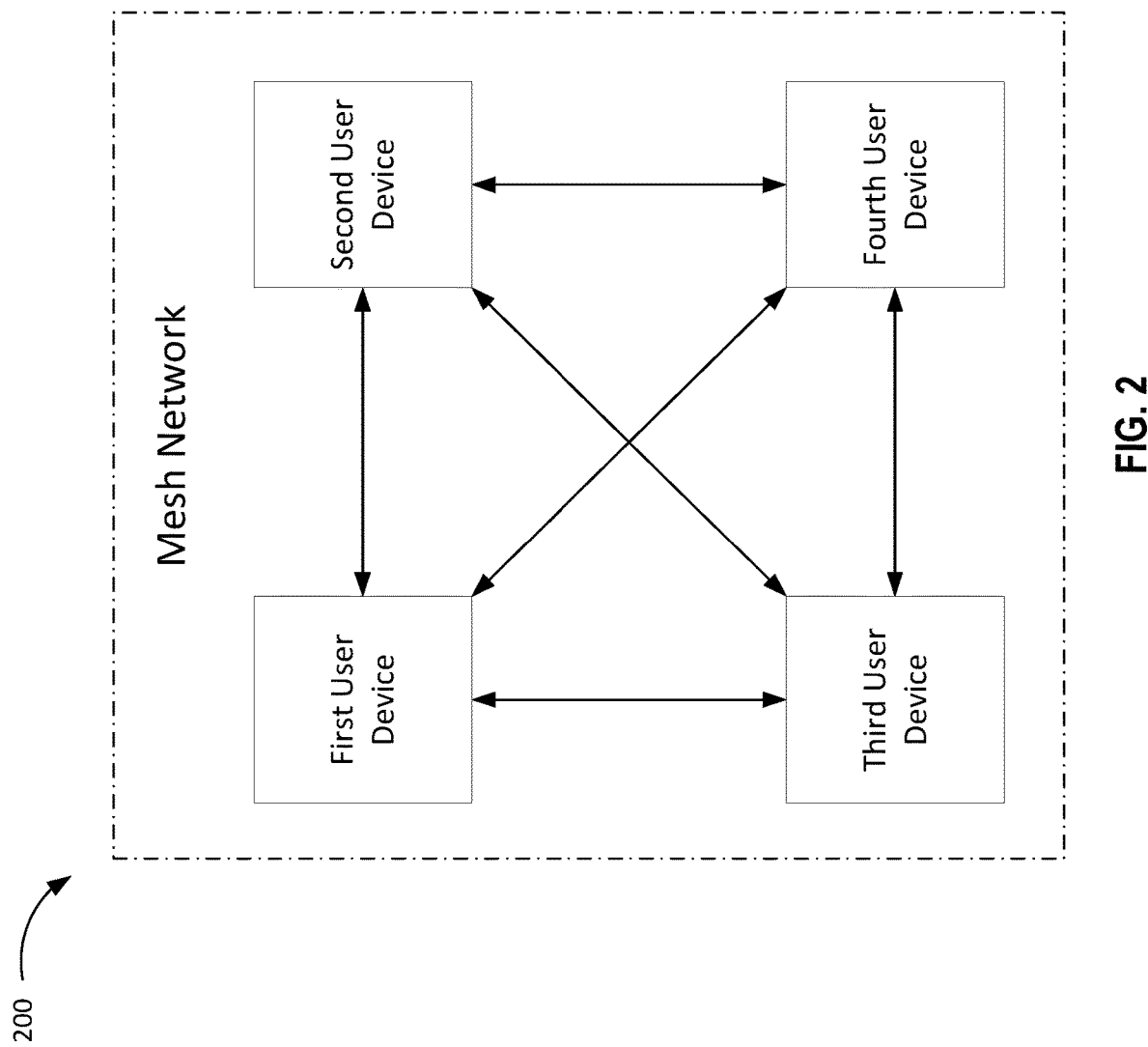

FIG. 2 is an illustration of an example associated with access control in a mesh network, according to various aspects of the present disclosure.

Figure 3:
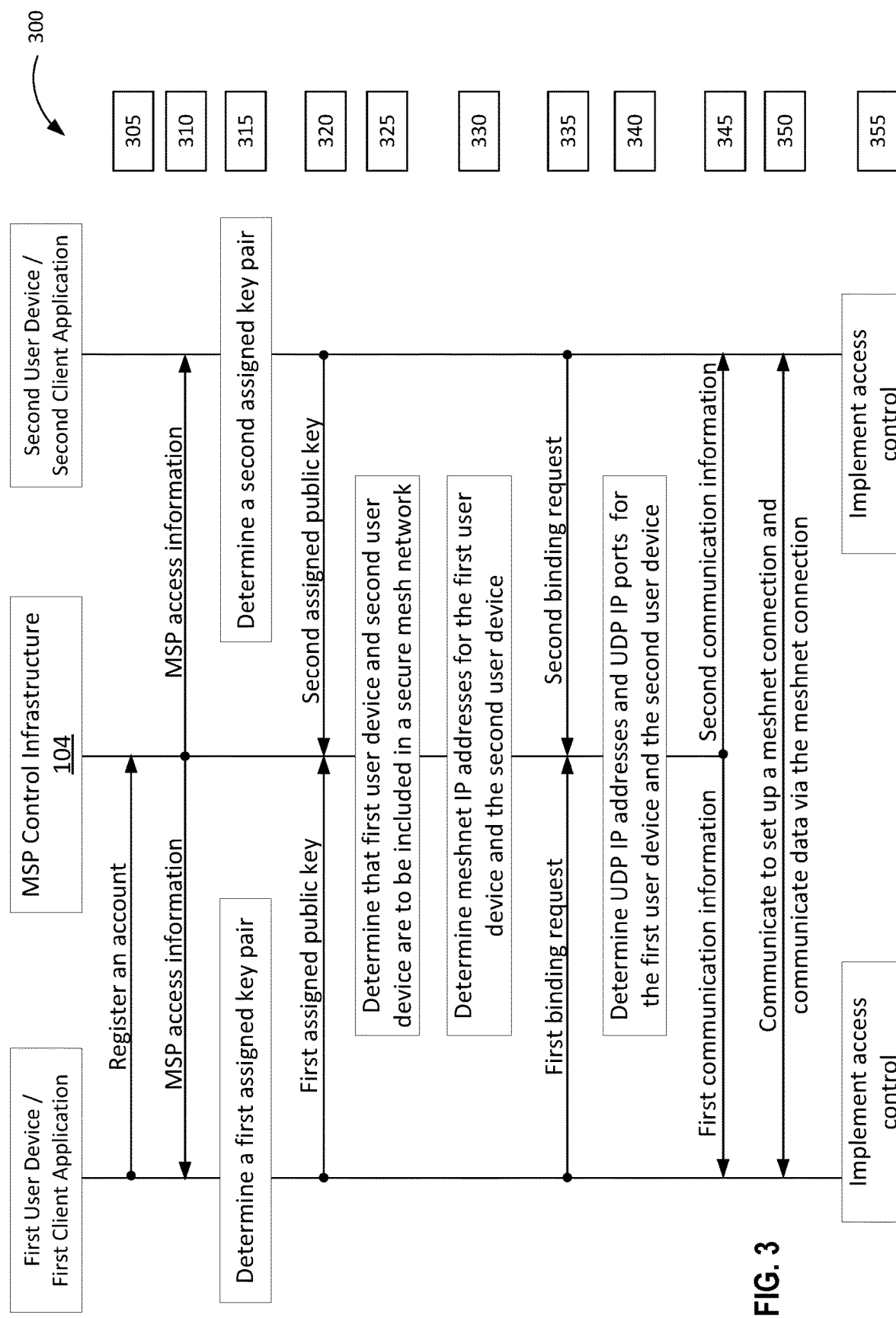

FIG. 3 is an illustration of an example flow associated with access control in a mesh network, according to various aspects of the present disclosure.

Figure 4:
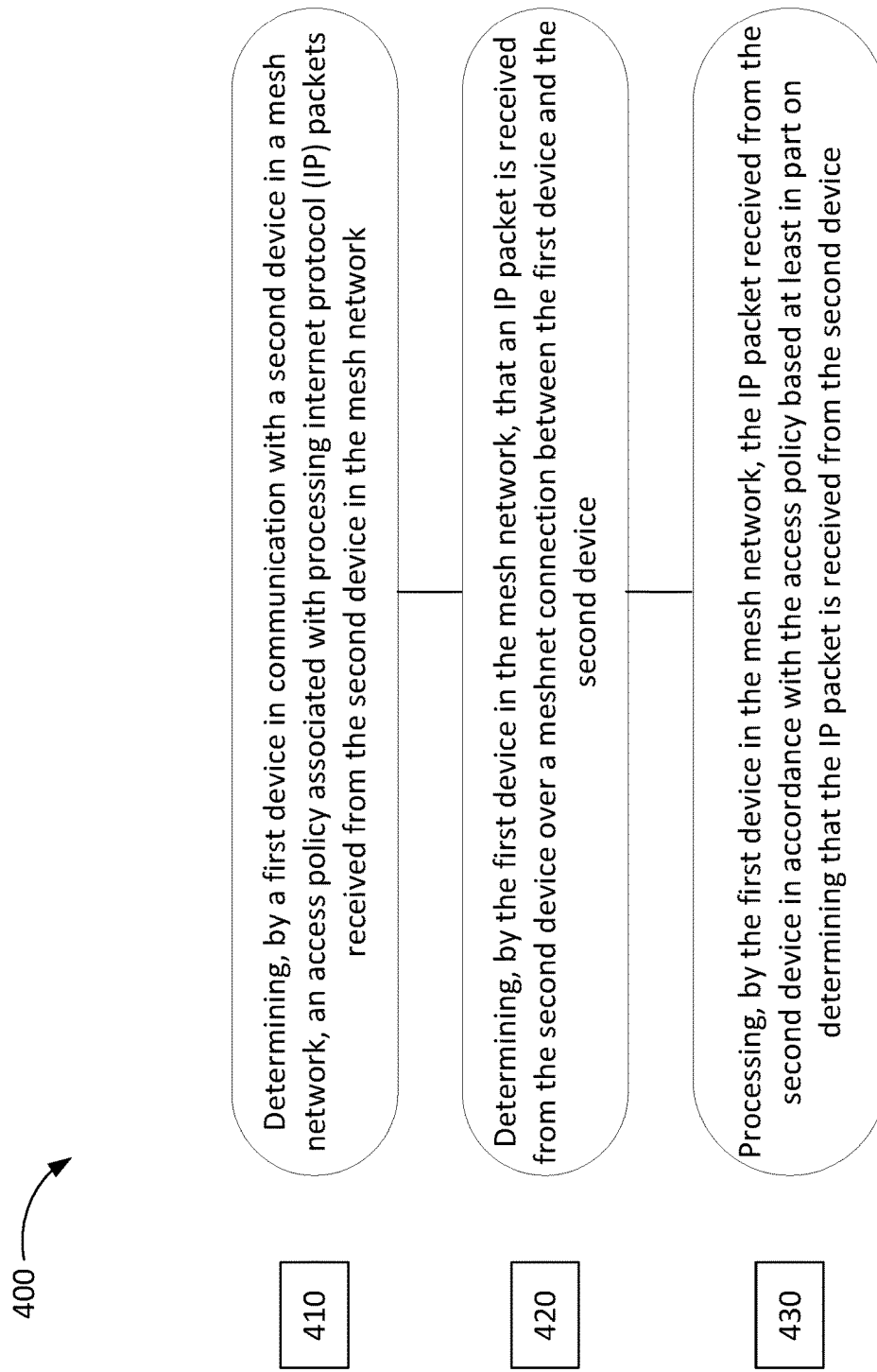

FIG. 4 is an illustration of an example process associated with access control in a mesh network, according to various aspects of the present disclosure.

Figure 5:
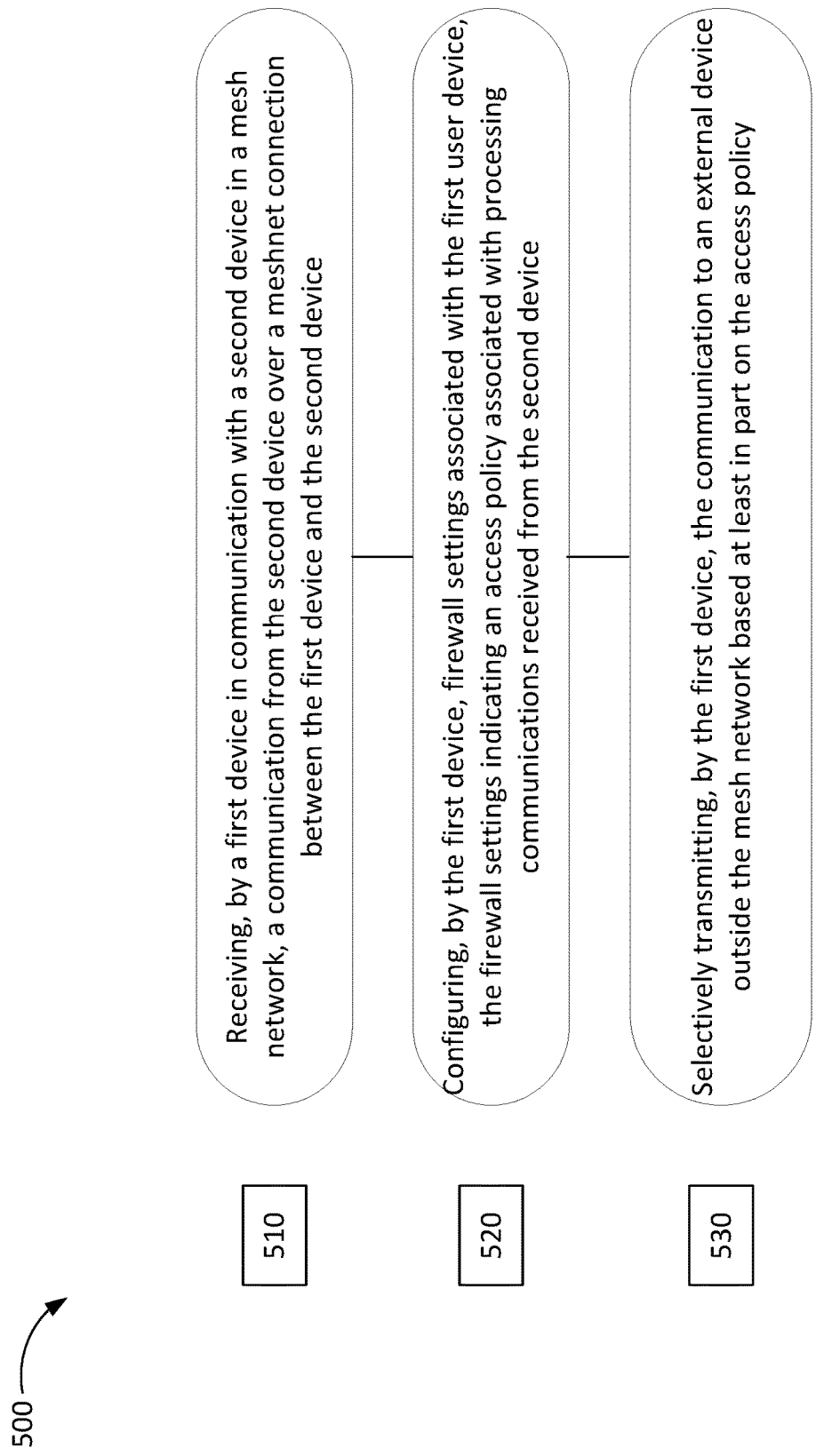

FIG. 5 is an illustration of an example process associated with access control in a mesh network, according to various aspects of the present disclosure.

Figure 6:
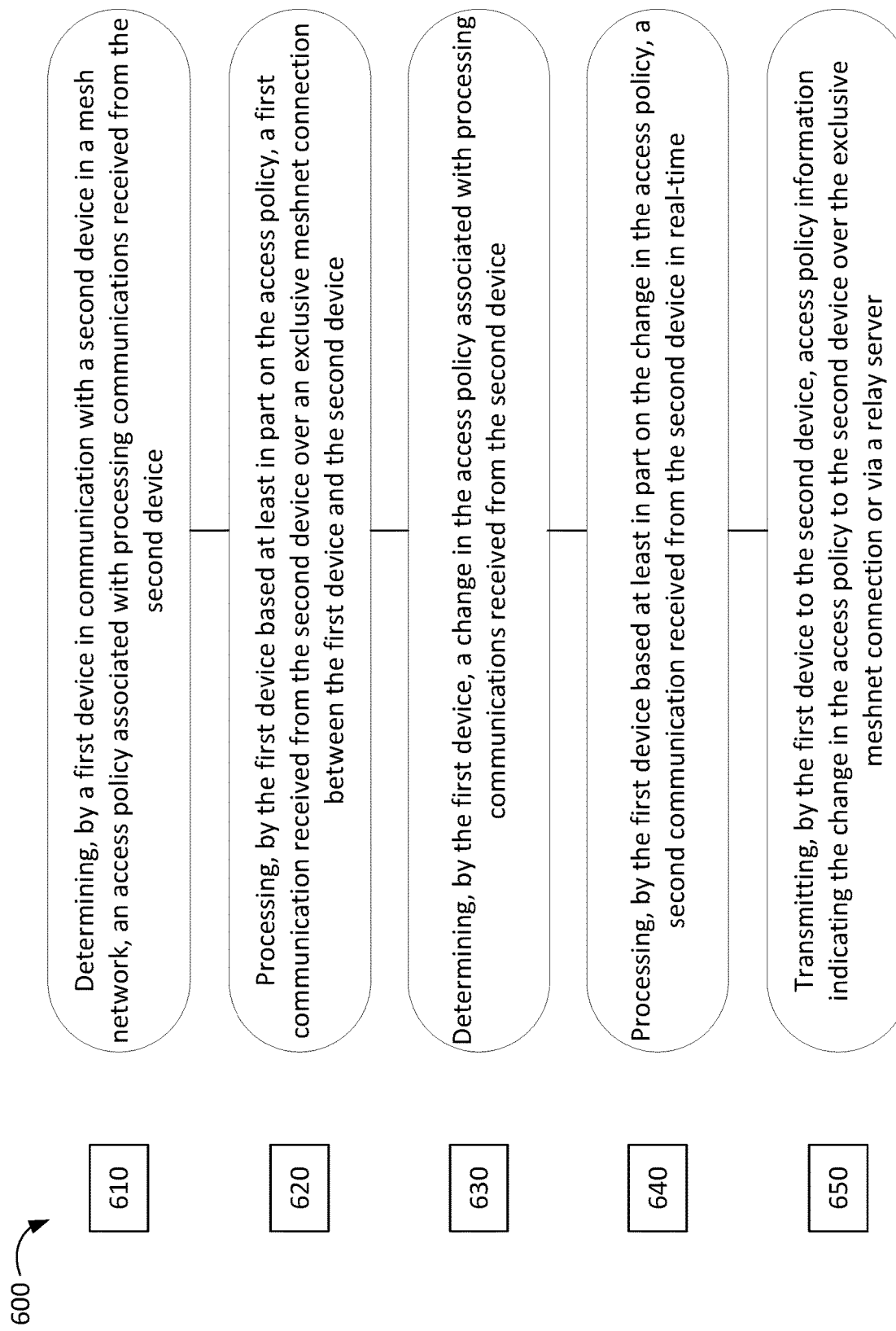

FIG. 6 is an illustration of an example process associated with access control in a mesh network, according to various aspects of the present disclosure.

Figure 7:
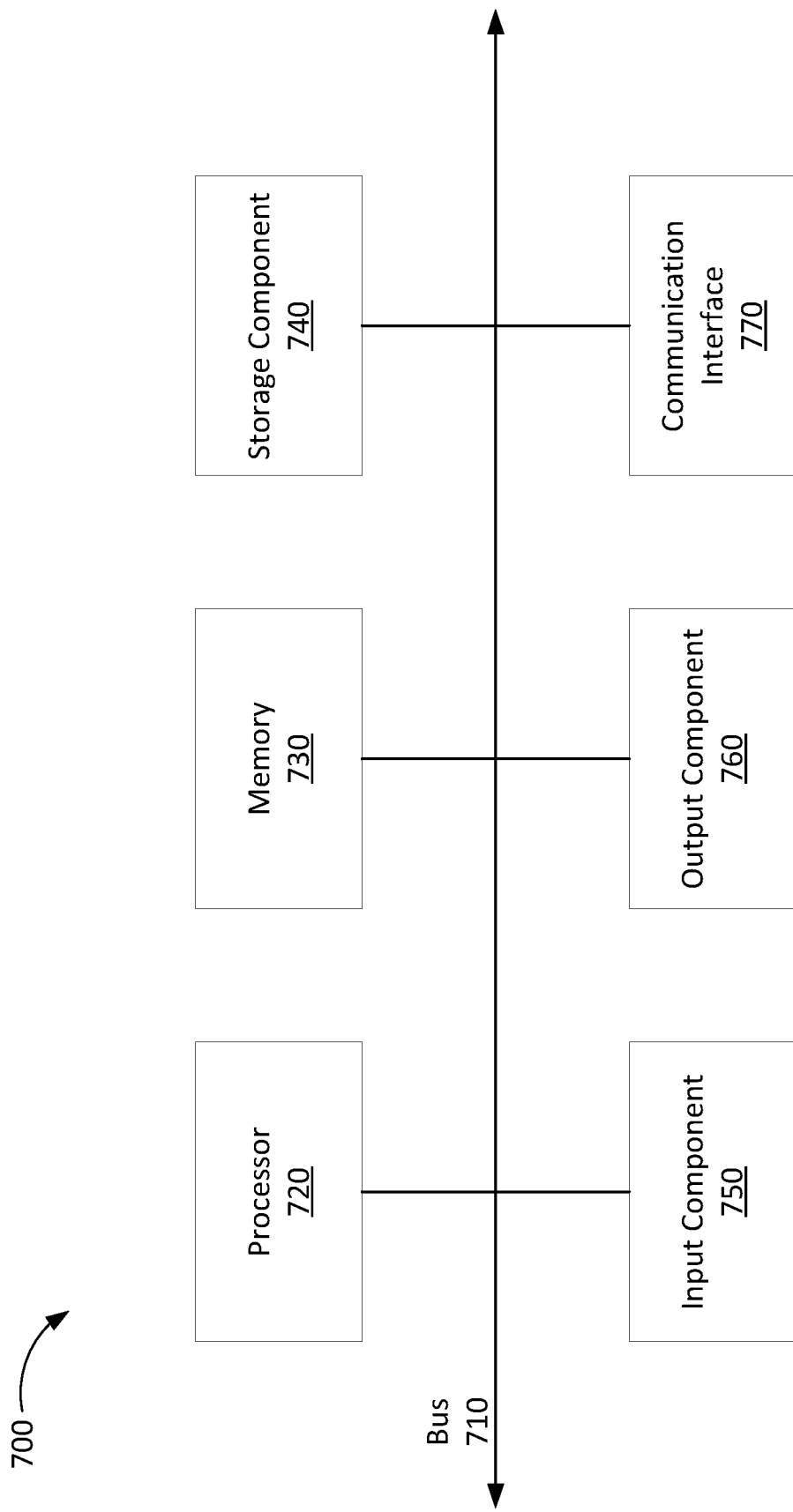

FIG. 7 is an illustration of example devices associated with access control in a mesh network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with access control in a mesh network, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a client application 114, which is provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, a router, or the like. In some aspects, the user device 102 may include, for example, mesh network enabled Internet-of-Things (IoT) devices such as smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API 106 a request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102.

The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, or a combination thereof (e.g., FIG. 7). For instance, the one or more components of the set of components may include or may be included in a controller/processor, a memory, or a combination thereof. In some aspects, the one or more of the components included in the MSP control infrastructure 104 and/or the user device 102 may be separate and distinct from each other. Alternatively, in some aspects, one or more of the components included in the MSP control infrastructure 104 and/or the user device 102 may be combined with one or more of other components included in the MSP control infrastructure 104. In some aspects, the one or more of the components included in the MSP control infrastructure 104 and/or the user device 102 may be local with respect to each other. Alternatively, in some aspects, one or more of the components included in the MSP control infrastructure 104 and/or the user device 102 may be located remotely with respect to one or more of other components included in the MSP control infrastructure 104 and/or the user device 102. Additionally, or alternatively, one or more components of the components included in the MSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A plurality of user devices (e.g., endpoints) may rely on a mesh network to communicate (e.g., transmit and/or receive) data among the endpoints. In example 200 shown in FIG. 2, the endpoints may include a first user device, a second user device, a third user device, and/or a fourth user device. The data may be communicated using wired communications and/or wireless communications over a network such as, for example, the Internet. The mesh network may be a secure mesh network that may enable the endpoints to communicate the data in encrypted form via meshnet connections (shown as double-ended arrows in FIG. 2). The communicated data may include any information including digital information such as, for example, documents including data, voice data, image data, signal data, and/or video data.

In some mesh networks, the endpoints may have full (e.g., uncontrolled) access to each other. In an example, an endpoint may have the ability to transmit data (e.g., a request for information and/or a request for response) to another endpoint and to receive associated information and/or an associated response. In some mesh networks, a given endpoint may determine respective access policies controlling how other endpoints access the given endpoint. In an example with respect to FIG. 2, the first user device may enable the second user device (e.g., a trusted endpoint) to transmit data to the first user device and to receive associated information and/or an associated response from the first user device. Alternatively, the first user device may refrain from granting such access to, for example, the fourth user device (e.g., an untrusted endpoint). In this case, the data transmitted by the fourth user device (e.g., untrusted endpoint that is not provided with access) to the first user device may be discarded by the first user device, and the fourth user device may fail to receive associated information or an associated response from the first user device. In another example with respect to FIG. 2, the first user device may grant access to, for example, the third user device to operate as an entry node (also referred to as a client node) with the first user device operating as an associated exit node such that data communicated (e.g., transmitted and/or received) between the third user device and an external device outside the mesh network may be routed through the first user device. The second user device, the third user device, and/or the fourth user device may determine respective access policies.

In such access-controlled mesh networks, implementing the respective access policies (e.g., providing the endpoints with access in the access-controlled mesh network) may be performed by a central server that is communicatively coupled with the endpoints. The central server may include a user control platform (UCP) and be included in, for example, an MSP control infrastructure. When a given endpoint determines a change in its respective access policy, the given endpoint may communicate the change to the central server, which, in turn, may communicate the change to the other endpoints in the access-controlled mesh network. Going forward, the other endpoints in the access-controlled mesh network may access the given endpoint in accordance with the change.

Communicating with the central server, which may be a single point of failure with respect to access policies, to implement the respective access policies may be inflexible because the given endpoint may have to wait until the central server has communicated the determined change to the other endpoints. The given endpoint may be unable to operate in accordance with the determined change until the central server has completed communicating the determined change to the other endpoints. As a result, a delay may be introduced in operating in accordance with the determined change. Further, communication between the given endpoint and the central server and between the central server and the other endpoints may inefficiently consume endpoint resources (e.g., processing resources, memory resources, power consumption resources, battery life, or the like) and MSP control infrastructure resources (computational resources, network bandwidth, management resources, processing resources, memory resources, or the like) that can otherwise be used to perform suitable tasks associated with the mesh network.

Various aspects of systems and techniques discussed in the present disclosure enable access control in a mesh network. In some aspects, an MSP control infrastructure may provide the mesh network to enable endpoints to securely communicate data. Further, the MSP control infrastructure may provide the endpoints with respective client applications to perform operations associated with the mesh network including, for example, communicating with each other for setting up respective meshnet connections to be utilized for communicating the data in the mesh network, communicating data with each other over the respective meshnet connections, and/or determining and implementing respective access policies. In some aspects, the respective client applications may enable the endpoints to determine access policies for each of the other endpoints in the mesh network. The respective client applications may also enable the endpoints to implement the access policies based at least in part on determining parameters associated with incoming communications and/or outgoing communications. Such parameters may include, for example, a source of the incoming and/or outgoing communication, a destination of the incoming and/or outgoing communication, etc. Further, the respective client applications may enable the endpoints to communicate the access policies and/or changes to the access policies to the other endpoints in the mesh network. In this way, the respective client applications may enable the endpoints to determine and implement the access policies and/or changes to the access policies in real-time without having to communicate with a central server. As a result, the endpoints may determine and implement access policies flexibly and without delay. Additionally, efficient consumption of endpoint resources (e.g., processing resources, memory resources, power consumption resources, battery life, or the like) and MSP control infrastructure resources (computational resources, network bandwidth, management resources, processing resources, memory resources, or the like) for performing suitable tasks associated with the mesh network may be enabled.

In some aspects, a processor (e.g., processing unit 116, processor 720) associated with a first user device may determine, during communication with a second device in a mesh network, an access policy associated with processing internet protocol (IP) packets received from the second device in the mesh network; determine, in the mesh network, that an IP packet is received from the second device; and process, in the mesh network, the IP packet received from the second device in accordance with the access policy based at least in part on determining that the IP packet is received from the second device.

As indicated above, FIG. 2 is provided as an example. Other examples may differ from what is described with regard to FIG. 2.

FIG. 3 is an illustration of an example flow 300 associated with access control in a mesh network, according to various aspects of the present disclosure. The example flow 300 may include a first user device (e.g., first endpoint), MSP control infrastructure 104, and a second user device (e.g., second endpoint) in communication with each other. The first user device and the second user device may be similar to a user device 102 discussed above with respect to FIG. 1. The first user device may install a first client application (e.g., client application 114) and the second user device may install a second client application (e.g., client application 114), the first client application and the second client application being associated with (e.g., provided by) the MSP control infrastructure 104. The first user device and the second user device may use the respective client applications to communicate with an application programming interface (API) and/or a processor (e.g., processing unit 110, processor 720) associated with the MSP control infrastructure 104. In some aspects, the first user device, the MSP control infrastructure 104, and the second user device may communicate with each other over a network (e.g., network 118). In some aspects, as discussed elsewhere herein, the MSP control infrastructure 104 may enable the first user device and/or the second user device to obtain the mesh network services via the respective client applications.

Although only two user devices (e.g., endpoints) are shown in FIG. 3, the present disclosure contemplates the mesh network to include any number of user devices that perform the processes discussed herein in a similar and/or analogous manner. For instance, the mesh network may include a third user device and a fourth user device, as discussed above with respect to FIG. 2, that perform the processes discussed herein in a similar and/or analogous manner. Other user devices that may join the mesh network may perform the processes discussed herein in a similar and/or analogous manner.

In some aspects, the first user device and the second user device may be associated with a single account registered with the MSP control infrastructure 104. In some aspects, the first user device and the second user device may be associated with different accounts registered with the MSP control infrastructure 104. In some aspects, the first user device and the second user device may be located locally (e.g., in the same room, in the same building, etc.). In some aspects, the first user device and the second user device may be located remotely (e.g., in different buildings, in different cities, in different states, in different countries, etc.) with respect to each other.

In some aspects, the respective client applications may enable the user devices to receive information to be processed by the respective client applications and/or by the MSP control infrastructure 104. Each of the client applications may enable respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration) of the account, the graphical interface for receiving the information. For instance, the first client application (or the second client application) may cause a screen (e.g., local screen) associated with the first user device (or the second user device) to display, for example, a pop-up message to request entry of the information. Further, the client applications may enable transmission of at least a portion of the received information to the MSP control infrastructure 104. In some aspects, as discussed below in further detail, the first client application may utilize a first processing unit (e.g., processing unit 116, processor 720) included in the first user device to perform processes/operations associated with obtaining the mesh network services and the second application may utilize a second processing unit (e.g., processing unit 116, processor 720) included in the second user device to perform processes/operations associated with obtaining the mesh network services.

As shown by reference numeral 305, the first user device may register an account with the MSP control infrastructure 104. In some aspects, during the registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the registered account. In some aspects, the first user device may share the login information with other user devices (e.g., second user device) associated with the first user device to enable the other user devices to utilize the login information to gain access to the MSP control infrastructure 104 via the registered account. In some aspects, a given user device may be associated with the first user device because the given user device may be available to a user/owner of the first user device. In some aspects, when the second user device is not associated with the registered account associated with the first user device, the second user device may register a different account with the MSP control infrastructure 104.

In some aspects, the first user device and the second user device may utilize the login information to access the registered account/accounts to communicate with the MSP control infrastructure 104. As shown by reference numeral 310, based at least in part on the first user device and the second user device accessing the registered account/accounts to communicate with the MSP control infrastructure 104, the MSP control infrastructure 104 may transmit, and the first client application and the second client application may receive, MSP access information. In some aspects, the MSP access information may include UDP access information. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the first user device and the second user device may utilize the infrastructure UDP IP address and the infrastructure UDP port to communicate with the MSP control infrastructure 104 regarding the mesh network. Further, the first client application and the second client application may obtain from, for example, a domain name services (DNS) server, transmission control protocol (TCP) access information associated with the MSP control infrastructure 104. Such TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP.

As shown by reference numeral 315, the first client application and the second client application may determine information based at least in part on the registration of the account/accounts with the MSP Control Infrastructure 104. In an example, the first client application may determine a first asymmetric assigned key pair associated with the first user device. The first assigned key pair may be unique to the first user device and may include a first assigned public key and a first assigned private key. In this way, the first assigned public key and the first assigned private key may be device-specific and maybe associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine a second asymmetric assigned key pair associated with the second user device. The second assigned key pair may be unique to the second user device and may include a second assigned public key and a second assigned private key. In this way, the second assigned public key and the second assigned private key may be device-specific and maybe associated with the registered account. In some aspects, the second assigned public key and the second assigned private key may be associated with each other via, for example, a mathematical function. As a result, data encrypted using the second assigned public key may be decrypted by utilizing the second assigned private key.

As shown by reference numeral 320, the client applications may transmit, and the MSP control infrastructure 104 may receive, at least a portion of the information determined by the client applications. For instance, the first client application may transmit the first assigned public key to the MSP control infrastructure 104 and the second client application may transmit the second assigned public key to the MSP control infrastructure 104. The MSP control infrastructure 104 may store and correlate the received information in association with the respective registered accounts and/or with the respective user devices. In some aspects, the first client application and the second client application may utilize the infrastructure TCP IP address and the infrastructure TCP port to transmit the first assigned public key and the second assigned public key to the MSP control infrastructure 104 via the TCP.

Further, as shown by reference numeral 325, the MSP control infrastructure 104 may determine that the first user device and the second user device are to be included in the same mesh network. In some aspects, when the first user device and the second user device are associated with the same registered account, the MSP control infrastructure 104 may make such a determination regarding the secure mesh network based at least in part on determining that the first user device and the second user device are communicating with the MSP control infrastructure 104 by utilizing the login information associated with the same registered account. In some aspects, when the first user device and the second user device are associated with different registered accounts, the MSP control infrastructure 104 may make such a determination regarding the secure mesh network based at least in part on the first user device (or the second user device) providing information indicating that the first user device and the second user device are to be included in the secure mesh network. Such information may include, for example, identification information (e.g., type of device, etc.) associated with the second user device (or the first user device), the second IP address (or the first IP address), or the like.

Based at least in part on determining that the first user device and the second user device are to be included in the same mesh network, as shown by reference numeral 330, the MSP control infrastructure 104 may determine meshnet IP addresses for the first user device and for the second user device. In an example, the MSP control infrastructure 104 may determine a first meshnet IP address associated with the first user device and a second meshnet IP address associated with the second user device. The first client application and/or another application installed on the first user device and/or the operating system associated with the first user device may utilize the first meshnet IP address and/or the first local meshnet port to communicate data with the endpoints over meshnet connections in the mesh network and the second user device may utilize the second meshnet IP address and/or the second local meshnet port to communicate data with the endpoints over the meshnet connections in the mesh network. In an example, with respect to communication between the first user device and the second user device, the first user device may determine a first meshnet IP packet indicating the first meshnet IP address as a source address, the first local meshnet port as a source port, the second meshnet IP address as a destination address, and the second local meshnet port as a destination port. The first user device may encrypt and encapsulate the first meshnet IP packet within a payload of a transmitted UDP IP packet. The second user device may receive the UDP IP packet, may decrypt the first meshnet IP packet, and may route the first meshnet IP packet to the second local meshnet port. Similarly, the second user device may determine a second meshnet IP packet indicating the second meshnet IP address as a source address, the second local meshnet port as a source port, the first meshnet IP address as a destination address, and the first local meshnet port as a destination port. The second user device may encrypt and encapsulate the second meshnet IP packet within a payload of a transmitted UDP IP packet. The first user device may receive the UDP IP packet, may decrypt the first meshnet IP packet, and may route the second meshnet IP packet to the first local meshnet port. The MSP control infrastructure 104 may determine the first meshnet IP address and the second meshnet IP address from, for example, a pool of reserved IP addresses included in a subnet associated with an internal network of the ISP.

As shown by reference numeral 335, the first user device and the second user device may transmit, and the MSP control infrastructure 104 may receive, respective binding requests. In an example, the first user device may transmit a first binding request to the MSP control infrastructure 104 to request the MSP control infrastructure 104 to determine a first UDP IP address (e.g., communication address) and/or a first UDP port (e.g., communication port) associated with the first device. In some aspects, the first user device may transmit the first binding request to the MSP control infrastructure 104 using the UDP by utilizing the UDP access information received from the MSP control infrastructure 104 (e.g., block 310). As discussed below in further detail, the first UDP IP address and/or the first UDP port are to be utilized by the second user device to communicate with the first user device in the mesh network. Similarly, the second user device may transmit a second binding request to the MSP control infrastructure 104 to request the MSP control infrastructure 104 to determine a second UDP IP address (e.g., communication address) and/or a second UDP port (e.g., communication port) associated with the second device. In some aspects, the second user device may transmit the second binding request to the MSP control infrastructure 104 using the UDP by utilizing the UDP access information received from the MSP control infrastructure 104 (e.g., block 310). As discussed below in further detail, the second UDP IP address and/or the second UDP port are to be utilized by the first user device to communicate with the second user device in the mesh network.

In some aspects, the first UDP IP address and/or the first UDP port may be determined by a first NAT device responsible for managing operation of the first user device in a first local network. In an example, the first NAT device may translate a first local UDP IP address and/or a first local UDP port associated with the first user device to the first UDP IP address and/or the first UDP port that the first user device utilizes to publicly communicate (e.g., transmit and/or receive) over the Internet using the UDP. Similarly, the second UDP IP address and/or the second UDP port may be determined by a second NAT device responsible for managing operation of the second user device in a second local network. In an example, the second NAT device may translate a second local UDP IP address and/or a second local UDP port associated with the second user device to the second UDP IP address and/or the second UDP port that the second user device utilized to publicly communicate (e.g., transmit and/or receive) over the Internet using the UDP.

Based at least in part on receiving the respective binding requests, as shown by reference numeral 340, the MSP control infrastructure 104 may determine UDP IP addresses and UDP ports for the first user device and the second user device. In an example, based at least in part on receiving the first binding request, the MSP control infrastructure 104 may determine the first UDP IP address and/or the first UDP port associated with the first user device. In some aspects, the MSP control infrastructure 104 may determine the first UDP IP address and/or the first UDP port based at least in part on analyzing the UDP communication (e.g., UDP IP packet) including the first binding request received from the first user device. The UDP communication may include, for example, a header that indicates the first UDP IP address as a source UDP IP address and/or the first UDP port as a source UDP port associated with the first user device. Similarly, based at least in part on receiving the second binding request, the MSP control infrastructure 104 may determine the second UDP IP address and/or the second UDP port associated with the second user device. In some aspects, the MSP control infrastructure 104 may determine the second UDP IP address and/or the second UDP port based at least in part on analyzing the UDP communication (e.g., UDP IP packet) including the second binding request received from the second user device. The UDP communication may include, for example, a header that indicates the second UDP IP address as a source UDP IP address and/or the second UDP port as a source UDP port associated with the second user device.

Based at least in part on determining the UDP IP addresses and/or the UDP ports, as shown by reference numeral 345, the MSP control infrastructure 104 may transmit, and the first client application and the second client application may receive, communication information. In an example, the MSP control infrastructure 104 may transmit, and the first client application may receive, first communication information including the first meshnet IP address associated with the first user device, the second meshnet IP address associated with the second user device, the first UDP IP address and the first UDP port associated with the first user device, the second UDP IP address and the second UDP port associated with the second user device, and/or the second public key associated with the second user device. Further, the first client application may store information associated with the first UDP IP address and/or the first UDP port in a memory associated with the first user device. Similarly, the MSP control infrastructure 104 may transmit, and the second client application may receive, second communication information including the first UDP IP address and the first UDP port associated with the first user device, the second UDP IP address and the second UDP port associated with the second user device, the first public key associated with the first user device, the first meshnet IP address associated with the first user device, and/or the second meshnet IP address associated with the second user device. Further, the second client application may store information associated with the second UDP IP address and/or the second UDP port in a memory associated with the second user device. As discussed below in further detail, the above transmission of communication information may enable the first user device and the second user device to communicate securely and privately in the mesh network.

As shown by reference numeral 350, the first user device and the second user device may communicate with each other directly to set up a meshnet connection (e.g., an encrypted tunnel) for communicating encrypted data in the hybrid mesh network. To set up the meshnet connection, the first client application may utilize the second assigned public key and/or the second public IP address (e.g., second UDP IP address) to securely (e.g., in encrypted form) communicate with the second user device, and the second client application may utilize the first assigned public key and/or the first public IP address (e.g., first UDP IP address) to securely communicate with the first user device. In some aspects, the first user device and the second user device may communicate to securely/privately negotiate parameters (e.g., a symmetric encryption/decryption key) associated with the meshnet connection. In some aspects, the parameters may be randomly generated to provide optimized security to the communications. In an example, the first user device and the second user device may privately negotiate a randomly generated symmetric key that is to be utilized by the first user device and the second user device for encrypting and decrypting data communicated via the meshnet connection. The randomly generated symmetric key may be determined based at least in part on any combination of the first public key, the second public key, and/or randomly generated numbers. Additionally, the first user device and the second user device may utilize a secure protocol (e.g., Wireguard, IP sec, etc.) to communicate the data via the meshnet connection.

Additionally, or alternatively, the first user device and the second user device may communicate with each other indirectly via, for example, a relay device (e.g., a relay server) to set up the meshnet connection. In an example, the first user device may provide the first assigned public key to a relay server, which may store an association of the first assigned public key with the first user device. In some aspects, the association may include an association between the first assigned public key and a first communication connection between the relay server and the first user device. Similarly, the second user device may provide the second assigned public key to the relay server, which may store an association of the second assigned public key with the second user device. In some aspects, the association may include an association between the second assigned public key and a second communication connection between the relay server and the first user device. The relay server may rely on the stored associations of public keys and user devices to determine a destination of a received message. In some aspects, the relay server may include a network of relay servers that enable the first user device and the second user device to communicate with each other. In this case, the first user device and the second user device may provide the respective assigned public keys to different relay servers included within the network of relay servers.

In some aspects, the first client application may transmit, to the relay server, a first message that is to be delivered to the second user device. Along with the first message, the first client application may transmit the second assigned public key. Further, the first client application may encrypt the first message utilizing the second assigned public key. In some aspects, the first client application may encrypt the first message based at least in part on utilizing the negotiated randomly generated symmetric key. Based at least in part on receiving the encrypted first message and the second assigned public key, the relay server may determine from stored associations that the second assigned public key is associated with the second user device. As a result, the relay server may determine that the first message is to be relayed (e.g., transmitted) to the second user device. Similarly, the second client application may transmit, to the relay server, a second message that is to be delivered to the first user device. Along with the second message, the second client application may transmit the first assigned public key. Further, the second client application may encrypt the second message utilizing the first assigned public key. In some aspects, the second client application may encrypt the second message based at least in part on utilizing the negotiated randomly generated symmetric key. Based at least in part on receiving the second message and the first assigned public key, the relay server may determine from stored associations that the first assigned public key is associated with the first user device. As a result, the relay server may determine that the second message is to be relayed (e.g., transmitted) to the first user device. In this way, the relay server may enable the first user device and the second user device to communicate with each other to set up the meshnet connection.

Based at least in part on setting up the meshnet connection, the first client application and the second client application may begin communicating encrypted data via the meshnet connection based at least in part on utilizing the negotiated and exchanged parameters and the secure protocol. In a similar and/or analogous manner, the first client application may set up meshnet connections with the third user device and the fourth user device.

Further, based at least in part on setting up the meshnet connections, as shown by reference numeral 355, the first user device and/or the second user device may implement access control. With respect to the first user device, as discussed below in further detail, the first user device may implement the access control by configuring local firewall settings to include new rules for implementing the access control. Further, the first user device may implement the access control by updating configured local firewall settings to include changed rules based at least in part on determining a change in the access control. Initially, the mesh network may be subject to, for example, default access control, which may include full access with the first user device, the second user device, the third user device, and the fourth user device being trusted devices with respect to each other. Alternatively, the default access control may include zero access with the first user device, the second user device, the third user device, and the fourth user device being untrusted devices with respect to each other.

In some aspects, the first user device may wish to change the default access control of the other user devices (e.g., the second user device, the third user device, and/or the fourth user device). In some aspects, the first user device may determine and allow the second user to operate as a trusted device such that the second user device may transmit data to the first user device and may receive associated information and/or an associated response from the first user device. Also, the first user device may determine and allow the third user device to operate an entry node, with the first user device operating as an associated exit node, such that all data communicated (e.g., transmitted and/or received) between the third user device and an external device outside the mesh network may be routed through the first user device. Further, the first user device may determine and allow the fourth user device to operate as an untrusted device such that data transmitted by the fourth user device to the first user device may be discarded by the first user device, and the fourth user device may fail to receive associated information or an associated response from the first user device.

To implement the above changes, the first user device may configure a firewall associated with the first user device. For instance, the first client application may configure the firewall to determine a source user device and a destination user device associated with an incoming packet (e.g., received packet) or an outgoing packet (e.g., transmitted packet). In an example, when an IP packet is received at the first user device, the firewall may analyze a header associated with the IP packet to determine the source user device and the destination user device associated with the IP packet based at least in part on UDP IP addresses and/or UDP ports. For instance, the header may indicate the UDP IP address associated with the transmitting user device as a source UDP IP address and/or the UDP port associated with the transmitting user device as a source UDP port. The header may also indicate the UDP IP address associated with the intended receiving user device as a destination UDP IP address and/or the UDP port associated with the intended receiving user device as a destination UDP port. In some aspects, the firewall may determine the source user device and the destination user device associated with the IP packet based at least in part on meshnet IP addresses and/or meshnet ports. The header may indicate the meshnet IP address associated with the transmitting user device as a source meshnet IP address and/or the meshnet port associated with the transmitting user device as a source meshnet port. The header may also indicate the meshnet IP address associated with the intended receiving user device as a destination meshnet IP address and/or the meshnet port associated with the intended receiving user device as a destination meshnet port.

Further, the first client application may configure the firewall to include rules associated with the other user devices in the mesh network. In some aspects, the new rules maybe associated with processing of a communicated IP packet based at least in part on a source user device and/or a destination user device associated with the received IP packet.

With respect to the second user device, the first client application may configure the firewall to include a rule indicating that data (e.g., IP packet) received from the second user device is to be accepted and responded to by transmitting appropriate information and/or an appropriate response to the second user device. With respect to the third user device, the first client application may configure the firewall to include a rule indicating that (i) data received from an external device outside the mesh network that is intended for the third user device is to be accepted and forwarded to the third user device, and (ii) data received from the third user device that is intended for the external device outside the mesh network is to be accepted and forwarded to the external device. With respect to the fourth user device, the first client application may configure the firewall to include a rule indicating that data received from the fourth user device to request information/response from the first user device is to be discarded without responding to the fourth user device. In some aspects, the rule with respect to the fourth user device may also indicate that response data, received from the fourth user device in response to a request transmitted by the first user device, is to be accepted and processed.

Based at least in part on configuring the firewall, the first client application may flexibly implement the changes in access control without delay. In an example, when the first user device receives an IP packet (e.g., with a request for information/response) from the second user device, the first client application and/or the firewall associated with the first user device may determine that the second user device is the source user device and that the first user device is the destination user device based at least in part on IP addresses and/or ports indicated by the information included in the header, as discussed elsewhere herein. Further, in accordance with the rule associated with the second user device, the first client application and/or another application installed on the first user device and/or the operating system associated with the first user device may process the IP packet by, for example, accepting the IP packet, analyzing the IP packet, and providing an appropriate information/response to the second user device.

When the first user device receives an IP packet from the third user device, the first client application and/or the firewall associated with the first user device may determine that the third user device is the source user device and that the external device outside the mesh network is the destination user device based at least in part on IP addresses and/or ports indicated by the information included in the header, as discussed elsewhere herein. Further, in accordance with the rule associated with the third user device, based at least in part on determining that the first user device is the destination user device, the first client application and/or another application installed on the first user device and/or the operating system associated with the first user device may process the IP packet by, for example, accepting the IP packet, analyzing the IP packet, and providing the appropriate information/response to the third user device. Alternatively, based at least in part on determining that the external device is the destination user device, the first client application may process the IP packet by accepting and forwarding the IP packet to the external device. In some aspects, to forward the IP packet, the first client application may modify the information included in the header to modify the indicated IP addresses and/or ports. In an example, the first client application may modify the IP addresses and/or ports to indicate that the third user device is the source user device and that the external device is the destination user device. In another example, the first client application may modify the IP addresses and/or ports to indicate that the first user device is the source user device and that the external device is the destination user device.

When the first user device receives an IP packet from the external device for the third user device, the firewall associated with the first user device may determine that the third user device is the destination user device based at least in part on IP addresses and/or ports indicated by the information included in the header, as discussed elsewhere herein. Further, in accordance with the rule associated with the third user device, based at least in part on determining that the third user device is the destination user device, the first client application may process the IP packet by accepting and forwarding the IP packet to the third user device. In some aspects, to forward the IP packet, the first client application may modify the information included in the header to modify the indicated IP addresses and/or ports. In an example, the first client application may modify the IP addresses and/or ports to indicate that the transmitting user device is the external device and that the third user device is the destination user device. In another example, the first client application may modify the IP addresses and/or ports to indicate that the first user device is the source user device and that the third user device is the destination user device.

When the first user device receives an IP packet from the fourth user device, the first client application and/or the firewall associated with the first user device may determine that the fourth user device is the source user device and that the first user device is the destination user device based at least in part on IP addresses and/or ports indicated by the information included in the header, as discussed elsewhere herein. Further, in accordance with the rule associated with the fourth user device, based at least in part on determining that the fourth user device is the source user device, the first client application may determine whether the received IP packet is an initiation IP packet or a response IP packet. In some aspects, the initiation IP packet may include a request from the fourth user device for the first user device to provide information and/or a response. A response IP packet may include a response from the fourth user device in reply to an initiation IP packet (e.g., request for information and/or a response) transmitted by the first user device. Based at least in part on determining that the received IP packet is the initiation IP packet, and based at least in part on the rule associated with the fourth user device, the first client application may discard the received initiation IP packet without processing the IP packet (e.g., analyzing and/or providing information and/or a response). Alternatively, based at least in part on determining that the received IP packet is the response IP packet, and based at least in part on the rule associated with the fourth user device, the first client application may process the IP packet by accepting the IP packet, analyzing the IP packet, and determining next steps.

In some aspects, the first user device may transmit access policy information to one or more user devices included in the mesh network. The policy information may include, for example, the access policy (e.g., rules, changes, etc.) associated with the other user devices in the mesh network, as determined by the first user device. In an example, the first user device may transmit the access policy information to the one or more devices via respective meshnet connections established with the one or more user devices.

In another example, the first user device may transmit the access policy information to the one or more devices via the relay server. For instance, the first user device may provide the access policy information to the relay server along with the assigned public keys associated with the one or more user devices. The relay server may rely on the stored associations of public keys and the user devices to determine a destination of the access policy information. In some aspects, the first client application may transmit, to the relay server, a first policy message including the access policy information that is to be delivered to the third user device. Along with the first policy message, the first client application may transmit the third assigned public key. Further, the first client application may encrypt the first policy message utilizing the third assigned public key. In some aspects, the first client application may encrypt the first policy message utilizing the randomly generated symmetric key negotiated between the first user device and the third user device. Based at least in part on receiving the encrypted first policy message and the third assigned public key, the relay server may determine from stored associations that the third assigned public key is associated with the third user device. As a result, the relay server may determine that the first policy message is to be relayed (e.g., transmitted) to the third user device. The first user device may transmit the access policy information to the second user device and/or to the fourth user device and/or another user device in the mesh network in a similar and/or an analogous manner.

In some aspects, other user devices included in the mesh network such as, for example, the second user device, the third user device, the fourth user device, and/or another user device in the mesh network may also implement respective access policies in the mesh network in a similar and/or an analogous manner as discussed above with respect to the first user device.

In this way, the respective client applications may enable the endpoints to determine and implement the access policies and/or changes to the access policies in real-time without having to communicate with a central server. As a result, the endpoints may determine and implement access policies flexibly and without delay. Additionally, efficient consumption of endpoint resources (e.g., processing resources, memory resources, power consumption resources, battery life, or the like) and MSP control infrastructure resources (computational resources, network bandwidth, management resources, processing resources, memory resources, or the like) for performing suitable tasks associated with the mesh network may be enabled.

As indicated above, FIG. 3 is provided as an example. Other examples may differ from what is described with regard to FIG. 3.

FIG. 4 is an illustration of an example process 400 associated with access control in a mesh network, according to various aspects of the present disclosure. In some aspects, the process 400 may be performed by a memory and/or a processor/controller (e.g., processing unit 116, processor 720) associated with a user device (e.g., user device 102) executing a client application. As shown by reference numeral 410, process 400 may include determining, by a first device in communication with a second device in a mesh network, an access policy associated with processing internet protocol (IP) packets received from the second device in the mesh network. For instance, the user device may utilize the associated memory and/or processor to determine, while in communication with a second device in a mesh network, an access policy associated with processing internet protocol (IP) packets received from the second device in the mesh network, as discussed elsewhere herein.

As shown by reference numeral 420, process 400 may include determining, by the first device in the mesh network, that an IP packet is received from the second device over a meshnet connection between the first device and the second device. For instance, the user device may utilize the associated memory and/or processor to determine, in the mesh network, that an IP packet is received from the second device, as discussed elsewhere herein.

As shown by reference numeral 430, process 400 may include processing, by the first device in the mesh network, the IP packet received from the second device in accordance with the access policy based at least in part on determining that the IP packet is received from the second device. For instance, the user device may utilize the associated memory and/or processor to process, in the mesh network, the IP packet received from the second device in accordance with the access policy based at least in part on determining that the IP packet is received from the second device, as discussed elsewhere herein.

Process 400 may include additional aspects, such as any single aspect or any combination of aspects described below and/or in connection with one or more other processes described elsewhere herein.

In a first aspect, in process 400, determining the access policy includes determining whether to provide a response to IP packets received from the second device, whether to discard IP packets received from the second device, or whether to forward IP packets received from the second device to another device in the mesh network.

In a second aspect, alone or in combination with the first aspect, in process 400, determining the access policy includes configuring firewall settings to enable processing of the IP packets received from the second device in accordance with the access policy.

In a third aspect, alone or in combination with the first through second aspects, in process 400, determining that the IP packet is received from the second device includes determining that the IP packet includes a source user datagram (UDP) IP address associated with the second device.

In a fourth aspect, alone or in combination with the first through third aspects, in process 400, determining that the IP packet is received from the second device includes determining that the IP packet includes a source meshnet IP address associated with the second device.

In a fifth aspect, alone or in combination with the first through fourth aspects, in process 400, processing the IP packet includes responding to the IP packet, discarding the IP packet, or forwarding the IP packet to another device in the mesh network.

In a sixth aspect, alone or in combination with the first through fifth aspects, process 400 may include transmitting the access policy to the second device via a meshnet connection between the first device and the second device or via a relay server.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with access control in a mesh network, according to various aspects of the present disclosure. In some aspects, the process 500 may be performed by a memory and/or a processor/controller (e.g., processing unit 116, processor 720) associated with a user device (e.g., user device 102) executing a client application. As shown by reference numeral 510, process 500 may include receiving, by a first device in communication with a second device in a mesh network, a communication from the second device over a meshnet connection between the first device and the second device. For instance, the user device may utilize an associated communication interface (e.g., communication interface 770) with the associated memory and/or processor to receive, while in communication with a second device in a mesh network, a communication from the second device over a meshnet connection between the first device and the second device, as discussed elsewhere herein.

As shown by reference numeral 520, process 500 may include configuring, by the first device, firewall settings associated with the first user device, the firewall settings indicating an access policy associated with processing communications received from the second device. For instance, the user device may utilize the associated memory and/or processor to configure firewall settings associated with the first user device, the firewall settings indicating an access policy associated with processing communications received from the second device, as discussed elsewhere herein.

As shown by reference numeral 530, process 500 may include selectively transmitting, by the first device, the communication to an external device outside the mesh network based at least in part on the access policy. For instance, the user device may utilize the associated communication interface, memory, and/or processor to selectively transmit the communication to an external device outside the mesh network based at least in part on the access policy, as discussed elsewhere herein.

Process 500 may include additional aspects, such as any single aspect or any combination of aspects described below and/or in connection with one or more other processes described elsewhere herein.

In a first aspect, in process 500, selectively transmitting the communication includes determining that the external device is a destination device associated with the communication.

In a second aspect, alone or in combination with the first aspect, in process 500, selectively transmitting the communication includes determining that the communication is received from the second device.

In a third aspect, alone or in combination with the first through second aspects, in process 500, selectively transmitting the communication includes determining that the communication is received from the second device based at least in part on a source meshnet Internet protocol (IP) address utilized by the second device to communicate in the mesh network.

In a fourth aspect, alone or in combination with the first through third aspects, in process 500, selectively transmitting the communication includes modifying the communication to indicate the second device as a source device and the external device as a destination device.

In a fifth aspect, alone or in combination with the first through fourth aspects, in process 500, the access policy indicates that a communication received from the second device for the external device is to be transmitted to the external device.

In a sixth aspect, alone or in combination with the first through fifth aspects, process 500 may include transmitting the access policy to the second device via the meshnet connection between the first device and the second device or via a relay server.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with access control in a mesh network, according to various aspects of the present disclosure. In some aspects, the process 600 may be performed by a memory and/or a processor/controller (e.g., processing unit 110, processor 720) associated with a user device (e.g., user device 102) executing a client application. As shown by reference numeral 610, process 600 may include determining, by a first device in communication with a second device in a mesh network, an access policy associated with processing communications received from the second device. For instance, a first user device may utilize the associated memory and/or processor to determine, while in communication with a second device in a mesh network, an access policy associated with processing communications received from the second device, as discussed elsewhere herein.

As shown by reference numeral 620, process 600 may include processing, by the first device based at least in part on the access policy, a first communication received from the second device over an exclusive meshnet connection between the first device and the second device. For instance, the first user device may utilize the associated memory and/or processor to process, based at least in part on the access policy, a first communication received from the second device over an exclusive meshnet connection between the first device and the second device, as discussed elsewhere herein.

As shown by reference numeral 630, process 600 may include determining, by the first device, a change in the access policy associated with processing communications received from the second device. For instance, the first user device may utilize the associated communication interface, memory, and/or processor to determine a change in the access policy associated with processing communications received from the second device, as discussed elsewhere herein.

As shown by reference numeral 640, process 600 may include processing, by the first device based at least in part on the change in the access policy, a second communication received from the second device in real-time. For instance, the first user device may utilize the associated memory and/or processor to process, based at least in part on the change in the access policy, a second communication received from the second device in real-time, as discussed elsewhere herein.

As shown by reference numeral 650, process 600 may include transmitting, by the first device to the second device, access policy information indicating the change in the access policy to the second device over the exclusive meshnet connection or via a relay server. For instance, the first user device may utilize the associated memory and/or processor to transmit, to the second device, access policy information indicating the change in the access policy to the second device over the exclusive meshnet connection or via a relay server, as discussed elsewhere herein.

Process 600 may include additional aspects, such as any single aspect or any combination of aspects described below and/or in connection with one or more other processes described elsewhere herein.

In a first aspect, process 600 may include updating firewall settings associated with the first user device, the firewall settings indicating the change in the access policy.

In a second aspect, alone or in combination with the first aspect, in process 600, wherein transmitting the access policy information includes encrypting the access policy information utilizing a public key associated with the second device.

In a third aspect, alone or in combination with the first through second aspects, in process 600, transmitting the access policy information via the relay server includes transmitting a public key associated with the second device.

In a fourth aspect, alone or in combination with the first through third aspects, in process 600, processing the second communication includes processing the second communication without communicating the change with a central server associated with the first user device and the second user device.

In a fifth aspect, alone or in combination with the first through fourth aspects, in process 600, processing the second communication includes providing a response to the second communication, discarding the second communication, or forwarding the second communication.

In a sixth aspect, alone or in combination with the first through fifth aspects, process 600 may include determining that the first communication or the second communication is received from the second device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with access control in a mesh network, according to various aspects of the present disclosure. In some aspects, the example devices 700 may form part of or implement the systems, servers, environments, infrastructures, components, devices, or the like described elsewhere herein (e.g., MSP control infrastructure, user device, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

determining, by a first device in communication with a second device in a mesh network, an access policy associated with processing communications received from the second device;

determining, by the first device, that a first communication is received from the second device over an exclusive meshnet connection between the first device and the second device:

processing, by the first device based at least in part on the access policy, the first communication received from the second device;

determining, by the first device, a change in the access policy associated with processing communications received from the second device;

updating, by the first device, firewall settings associated with the first user device, the firewall settings indicating the change in the access policy;

determining, by the first device, that a second communication is received from the second device over the exclusive meshnet connection;

processing, by the first device based at least in part on the change in the access policy, the second communication received from the second device in real-time; and transmitting, by the first device to the second device, access policy information indicating the change in the access policy to the second device over the exclusive meshnet connection or via a relay server.

2. The method of claim 1, wherein the first device or the second device is not a switch or a router.

3. The method of claim 1, wherein transmitting the access policy information includes encrypting the access policy information utilizing a public key associated with the second device.

4. The method of claim 1, wherein transmitting the access policy information via the relay server includes transmitting a public key associated with the second device.

5. The method of claim 1, wherein processing the second communication includes processing the second communication without communicating the change with a central server associated with the first user device and the second user device.

6. The method of claim 1, wherein processing the second communication includes providing a response to the second communication, discarding the second communication, or forwarding the second communication.

7. The method of claim 1, wherein determining the access policy includes determining whether to provide a response to IP packets received from the second device, whether to discard IP packets received from the second device, or whether to forward IP packets received from the second device to another device in the mesh network.

8. A first device, comprising:
a memory; and
a processor communicatively coupled to the memory, the memory and the processor being configured to:
  determine, while in communication with a second device in a mesh network, an access policy associated with processing communications received from the second device;
  determine that a first communication is received from the second device over an exclusive meshnet connection between the first device and the second device;
  process, based at least in part on the access policy, the first communication received from the second device;
  determine a change in the access policy associated with processing communications received from the second device;
  update firewall settings associated with the first user device the firewall settings indicating the change in the access policy;
  determine that a second communication is received from the second device over the exclusive meshnet connection;
  process, based at least in part on the change in the access policy, the second communication received from the second device in real-time; and
  transmit, to the second device, access policy information indicating the change in the access policy to the second device over the exclusive meshnet connection or via a relay server.

9. The first device of claim 8, wherein the first device or the second device is not a switch or a router.

10. The first device of claim 8, wherein, to transmit the access policy information, the memory and the processor are configured to encrypt the access policy information utilizing a public key associated with the second device.

11. The first device of claim 8, wherein, to transmit the access policy information via the relay server, the memory and the processor are configured to transmit a public key associated with the second device.

12. The first device of claim 8, wherein, to process the second communication, the memory and the processor are configured to process the second communication without communicating the change with a central server associated with the first user device and the second user device.

13. The first device of claim 8, wherein to process the second communication, the memory and the processor are configured to provide a response to the second communication, discard the second communication, or forward the second communication.

14. The first device of claim 8, wherein, to determine the access policy, the memory and the processor are configured to determine whether to provide a response to IP packets received from the second device, whether to discard IP packets received from the second device, or whether to forward IP packets received from the second device to another device in the mesh network.

15. A non-transitory computer-readable medium configured to store instructions, which when executed by a processor associated with a first device, configure the processor to:
  determine that a first communication is received from the second device over an exclusive meshnet connection between the first device and the second device;
  process, based at least in part on the access policy, the first communication received from the second device;
  determine a change in the access policy associated with processing communications received from the second device;
  update firewall settings associated with the first user device, the firewall settings indicating the change in the access policy;
  determine that a second communication is received from the second device over the exclusive meshnet connection;
  process, based at least in part on the change in the access policy, the second communication received from the second device in real-time; and
  transmit, to the second device, access policy information indicating the change in the access policy to the second device over the exclusive meshnet connection or via a relay server.

16. The non-transitory computer-readable medium of claim 15, wherein the first device or the second device is not a switch or a router.

17. The non-transitory computer-readable medium of claim 15, wherein, to transmit the access policy information, the processor is configured to encrypt the access policy information utilizing a public key associated with the second device.

18. The non-transitory computer-readable medium of claim 15, wherein, to transmit the access policy information via the relay server, the processor is configured to transmit a public key associated with the second device.

19. The non-transitory computer-readable medium of claim 15, wherein, to process the second communication, the processor is configured to process the second communication without communicating the change with a central server associated with the first user device and the second user device.

20. The non-transitory computer-readable medium of claim 15, wherein to process the second communication, the processor is configured to provide a response to the second communication, discard the second communication, or forward the second communication.

\* \* \* \* \*